(12) United States Patent
Hettich

(10) Patent No.: US 8,920,093 B2
(45) Date of Patent: Dec. 30, 2014

(54) THREAD-FURROWING SCREW

(75) Inventor: Ulrich Hettich, Schramberg (DE)

(73) Assignee: Ludwig Hettich & Co., Schramberg-Sulgen (DE)

( * ) Notice: Subject to any disclaimer, the term of this patent is extended or adjusted under 35 U.S.C. 154(b) by 1084 days.

(21) Appl. No.: 12/935,451

(22) PCT Filed: Feb. 9, 2009

(86) PCT No.: PCT/EP2009/000895
§ 371 (c)(1),
(2), (4) Date: Aug. 3, 2011

(87) PCT Pub. No.: WO2009/121448
PCT Pub. Date: Oct. 8, 2009

(65) Prior Publication Data
US 2011/0286814 A1    Nov. 24, 2011

(30) Foreign Application Priority Data
Apr. 2, 2008   (DE) .................. 10 2008 016 866

(51) Int. Cl.
*F16B 35/04*   (2006.01)
(52) U.S. Cl.
USPC ................ 411/425; 470/14; 29/456
(58) Field of Classification Search
USPC ................... 470/8, 11, 14; 29/456
See application file for complete search history.

(56) References Cited

U.S. PATENT DOCUMENTS

| | | | | |
|---|---|---|---|---|
| 240,780 | A | * | 4/1881 | Smith ............................ 74/458 |
| 1,437,009 | A | | 11/1922 | Perkins et al. |
| 2,520,232 | A | * | 8/1950 | Bereza ......................... 411/423 |
| 2,549,393 | A | | 4/1951 | Siesel |
| 2,585,304 | A | * | 2/1952 | Evans et al. ................... 403/241 |
| 3,515,027 | A | * | 6/1970 | Textrom ....................... 411/438 |
| 3,983,736 | A | * | 10/1976 | King, Jr. ......................... 72/362 |
| 4,040,326 | A | * | 8/1977 | Breed ............................ 411/378 |
| 4,762,453 | A | * | 8/1988 | DeCaro ......................... 411/383 |
| 5,114,290 | A | * | 5/1992 | Moghe ........................ 411/411 |
| 5,234,765 | A | * | 8/1993 | Taylor et al. ................. 428/365 |
| 5,961,266 | A | * | 10/1999 | Tseng ........................... 411/383 |
| 6,955,513 | B2 | * | 10/2005 | Niku ............................ 411/382 |
| 2004/0258502 | A1 | * | 12/2004 | Unsworth et al. ............ 411/412 |

FOREIGN PATENT DOCUMENTS

| | | |
|---|---|---|
| CH | 237674 A | 5/1945 |
| DE | 19540848 A1 | 5/1997 |
| DE | 19841135 A1 | 9/1998 |
| DE | 10149755 A1 | 4/2003 |
| WO | 82/00505 A1 | 2/1982 |

OTHER PUBLICATIONS

International Bureau, International Preliminary Examination Report on Patentability, Oct. 14, 2010.

\* cited by examiner

*Primary Examiner* — Gary Estremsky
(74) *Attorney, Agent, or Firm* — Duane Morris LLP

(57) ABSTRACT

A thread-furrowing screw comprises a shaft portion made of solid material and a thread portion attached to the shaft portion, which thread portion is wound from a profiled metal strip.

14 Claims, 3 Drawing Sheets

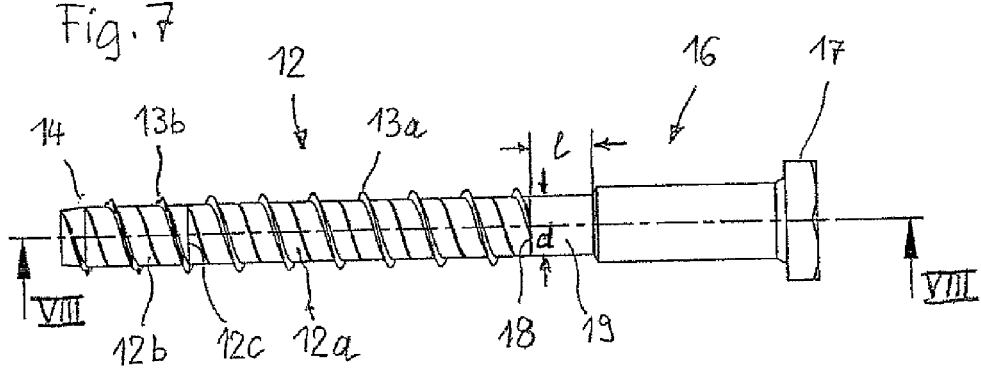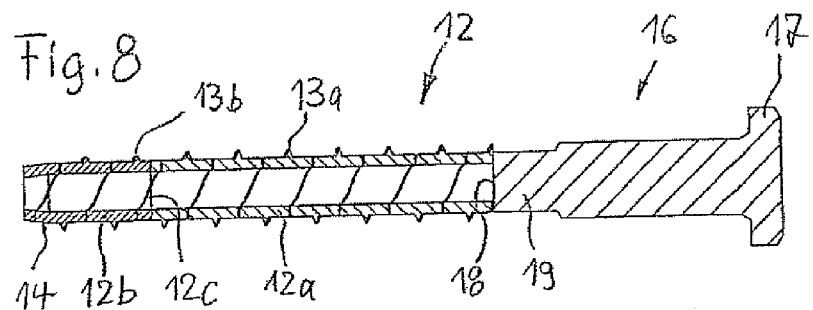

Figure 1:
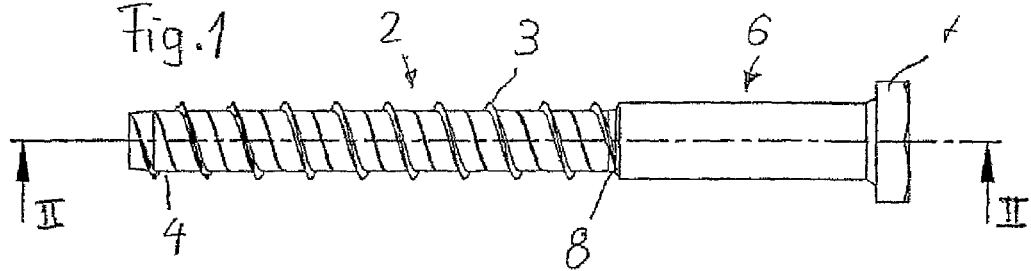

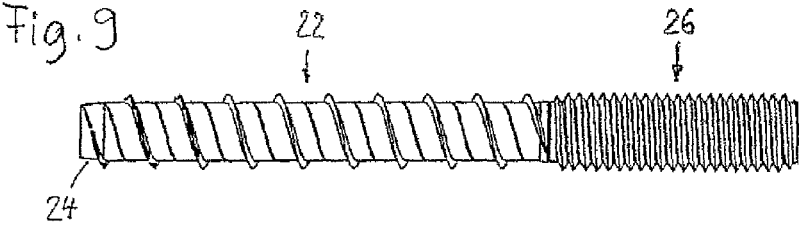
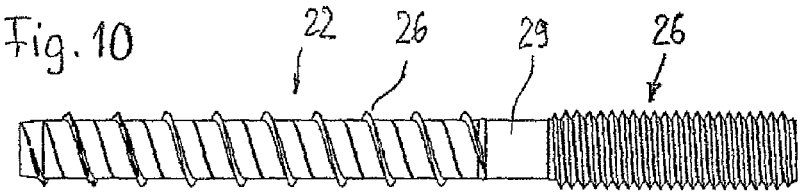
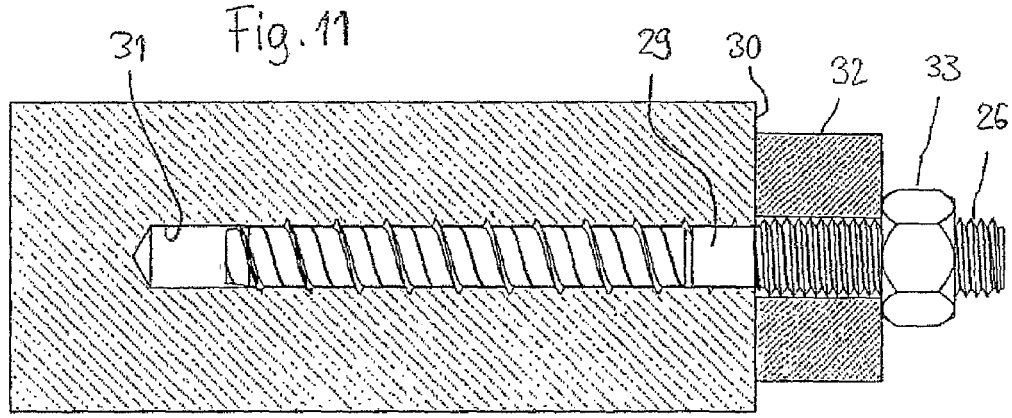
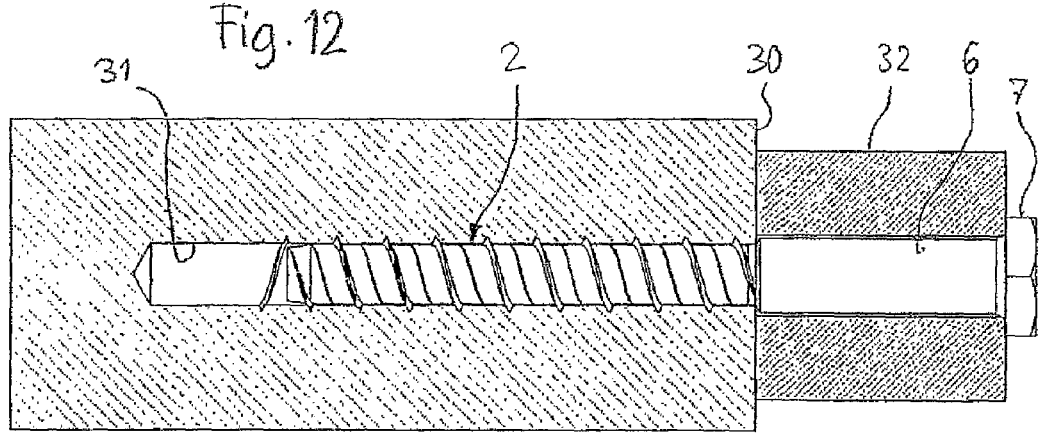

THREAD-FURROWING SCREW

The invention relates to a thread-furrowing screw as it is used, in particular, for direct screwing into concrete, masonry or rock as a holder for attachment parts.

Such a screw, also referred to as an anchoring bolt, as a rule is a single-piece component made of solid material, in which component the thread is applied to a shaft portion by means of cold solid forming, such as rolling, or by chip-removing machining, such as turning, whirling or gear hobbing.

The known manufacturing methods are elaborate and expensive and require a large quantity of material, in particular in the case of machining of the thread. However, in cold solid forming, too, solid material is always used as the source material.

It is the problem of the invention to create a thread-furrowing screw and a method for its manufacture, wherein more economical manufacture with reduced use of material is achievable.

This problem is solved by a thread-furrowing screw according to claim 1, and by a method according to claim 9.

The screw according to the invention comprises a shaft portion made of solid material, and a thread portion attached to the shaft portion, which thread portion is wound from a profiled metal strip and consequently is hollow.

Such a screw can be manufactured in that a profiled metal strip is wound to form a thread portion, and thereafter is attached to the shaft portion made from solid material.

Thread-furrowing in hard material, such as concrete or rock, requires considerable hardness in the screw-in region of the thread. On the other hand, in the use of screws as anchoring bolts in construction engineering considerable corrosion resistance is expected, particularly in those cases where anchoring bolts are used in external regions of buildings.

It is therefore a subordinate problem of the invention to create a screw and a method for its manufacture, which screw and method apart from adequate loadability, in particular by bending and shearing forces, and adequate hardness for thread-furrowing in concrete or stone, also have high corrosion resistance.

This subordinate problem is solved by claim 4. The thread portion comprises two thread sections that are made from different metals, in particular the thread-furrowing thread section made from a hardenable steel with a high carbon content, and the thread section that carries the main load, made from a stainless steel that is approved for construction engineering and that is highly alloyed and thus corrosion resistant.

A screw according to claim 4 can be manufactured economically with the use of various manufacturing methods. Thus, in a method according to claim 11 firstly the two profiled strip sections are attached to each other and thereafter jointly wound so as to manufacture the wound thread portion, whereupon the wound thread portion is hardened in the region of the second strip section. Only thereafter the shaft portion and the thread portion are connected by attaching.

In an alternative method according to claim 12 the first thread section is wound from a profile strip comprising a corrosion-resistant steel. Separately thereof, the second thread section is wound from a profiled strip comprising hardenable steel and is subsequently hardened. Only after this the two thread sections are joined, and connected to the shaft portion again by means of attaching.

Instead of the above, the second thread section could also be made from solid material and the thread could be formed in the conventional manner before said second thread section is hardened separately from the first thread section.

Preferably, the thread sections are joined to each other and to the shaft portion by means of laser welding, resistance welding or friction welding.

Conventional manufacture of the thread portion by means of cold solid forming or chip-removing machining of the threads is particularly elaborate and expensive in a case in which a screw of the type described is required to comprise two different threads of different diameters, namely a metric thread on the shaft portion made from solid material, and a concrete thread on the thread portion. The metric thread here serves to provide improved support of attachment parts, e.g. facade parts on concrete external walls. In mounted state the screws or anchoring bolts are often subjected to considerable transverse loads resulting from transverse forces. Such transverse forces form so-called plastic hinges within the concrete in a distance spaced apart from the mouth of the screw hole. This distance depends on the type of materials pairing. In the case of the pairing of steel/concrete, the plastic hinge is assumed to be at a distance from the mouth of the hole of at least 0.5 times the core diameter of the thread portion in the screw hole.

According to an advantageous improvement of the invention, therefore, a leading end of the shaft portion which enters the base material (concrete) through the screw hole has a reduced diameter which, in particular, approximately corresponds to the core diameter of the wound thread portion and has a length that approximately corresponds to 0.5 to 1.5 times the core diameter of the load-bearing thread portion in the screw hole.

In this improved embodiment the transverse load-bearing capacity of the screw can be used perfectly.

Other embodiments of the invention are mentioned in the further subordinate claims.

Figure 2:
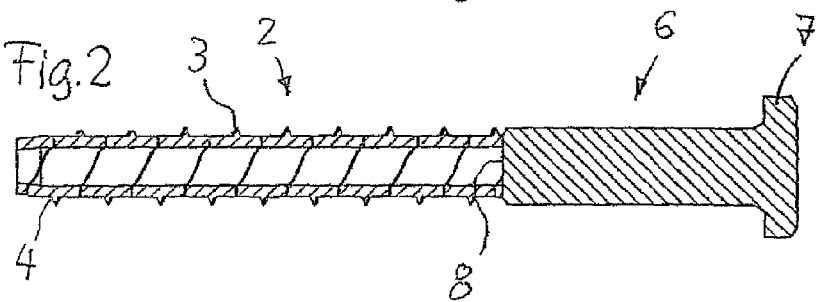
Figure 3:
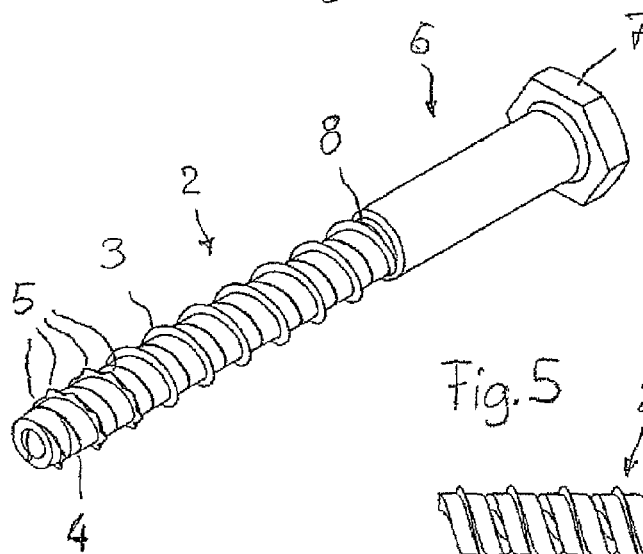
Figure 5:
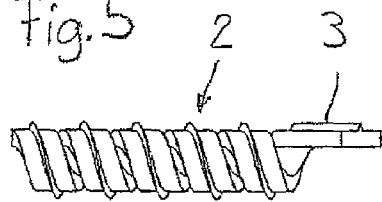
Figure 4:
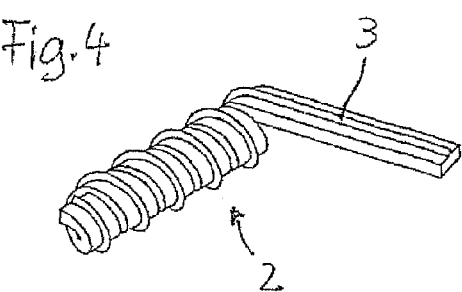
Figure 6:
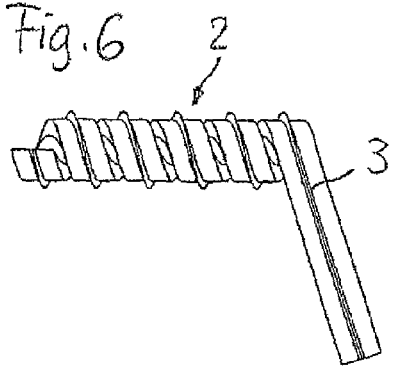

Below, the invention is explained in more detail with reference to diagrammatic drawings of exemplary embodiments. In the drawings represent:

FIG. 1 a lateral view of a first embodiment of a screw according to the invention;

FIG. 2 a section along line II-II in FIG. 1;

FIG. 3 a perspective view of the screw according to FIGS. 1 and 2;

FIG. 4 a perspective view of a wound thread portion of the screw according to FIGS. 1 to 3;

FIGS. 5 and 6 a lateral view and a top view of the wound thread portion according to FIG. 4;

FIG. 7 a lateral view of a second embodiment of a screw according to the invention;

FIG. 8 a section along line VIII-VIII in FIG. 7;

FIG. 9 a lateral view of a third embodiment according to the invention;

FIG. 10 a lateral view of a variant of the third embodiment of a screw according to FIG. 9, similar to that of FIG. 7;

FIG. 11 a screw according to FIG. 10 in the mounted state with a holder of an attachment part on a wall; and FIG. 12 a screw according to FIG. 1 in the mounted state with a holder of an attachment part on a wall.

The screw shown in FIGS. 1 to 3 is a so-called anchoring bolt for direct thread-furrowing screwing into concrete, rock or masonry with the purpose of securely fastening attachment parts to the outside of a concrete wall or the like. The anchoring bolt comprises a thread portion 2 that is wound from a profiled metal strip. The profile comprises a longitudinal rib impressed in the metal strip, which rib extends in the same direction as do the lateral edges of the metal strip, and as a result of the winding of the strip forms a thread 3 that is suitable for furrowing a thread in a pre-drilled hole in the concrete. At the screwing-in end 4 the thread portion 2 is wound so as to conically taper in order to facilitate insertion of the screw into a pre-drilled hole. FIGS. 1 and 3 show that the thread 3 in the region of the screw-in end 4 for a length of up to three windings comprises teeth or serrations 5 that support furrowing as known per se.

Adjoining the thread portion 2 is a shaft portion 6 made of solid material, which shaft portion 6 carries a drive on its installation end, which here is formed by a hexagon head 7. The shaft portion 6 has a length that approximately corresponds to the width of an attachment part to be fastened. The wound thread portion 2 and the shaft portion 6 are attached to each other at a separating joint 8 for example by welding, such as laser welding, resistance welding or friction welding. It is a prerequisite for this that the shaft portion 6 is made from metal, for example an engineering steel, that can be welded to the metal of the thread portion 2. However, the shaft portion 6 may also be made from a hard plastic. In this case the portions 2, 6 may be attached to each other by bonding or by means of some other known joining technique.

In order to maintain elasticity in the region of its tapered screw-in end 4 the thread portion 2 can be hardened so as to allow for thread-furrowing. However, in the load-carrying main region the thread portion 2 is left non-hardened.

In FIGS. 4 to 6 the thread portion 2 is once again shown in the stage of being wound from a profiled metal strip. It may be seen that the thread 3 is formed by a middle rib profile in longitudinal direction of the metal strip, that is parallel to the direction of winding. However, this is not mandatory; profiling that deviates from the longitudinal direction of the strip, or a design comprising multiple threads 3, is also possible.

FIGS. 7 and 8 show a second embodiment of the invention in which identical or identically functioning parts are designated by reference numerals in increments of 10.

In this embodiment the thread portion 12 is divided into two wound thread sections 12a and 12b that are attached to each other at a separating joint 12c and that form a thread 13 composed by two partial threads 13a, 13b providing a seamless transition, which thread 13 has been generated by corresponding profiling of two metal strips during winding.

Also in this embodiment the thread section 12b that is used for thread furrowing comprises a conically tapering wound screw-in end 14. Said thread section is made from a hardenable engineering steel with a high carbon content and after hardening obtained a hardness that is suitable for thread furrowing. In contrast thereto the thread section 12b, which for the purpose of preventing corrosion can made from a high-alloyed stainless steel, is rather soft and elastic so as to take up the main load that acts on the screw as a result of bending and shearing due to the transverse forces exerted by the attachment parts onto the shaft portion 16 of the screw.

The shaft portion 16 has a step or recess 19 of a reduced diameter which step 19 is joined to the thread portion 12 via the separating joint 18 and has a length 1 that corresponds to 0.5 times to 1.5 times the core diameter d of the thread 13. In this embodiment the reduced diameter of step 19 equals the core diameter d of the thread 13.

Apart from the head 17 the remaining part of the shaft portion 16 has the same diameter as the external diameter of the thread 13.

Prior to hardening of the thread section 12b the two thread sections 12a, 12b can in a first method be jointly wound when still being separated from the shaft portion 16 before the thread section 12b is hardened and the thread portion 12 is attached with the first thread section 12a to the shaft portion 16.

In an alternative method the thread sections 12a, 12b can be wound separately from each other so that the thread section 12b designated for furrowing can be hardened independently from the thread section 12a. Only thereafter the thread sections 12a and 12b are welded together, namely before or after attaching of the first thread section 12a to the step 19 of the shaft portion 16.

FIGS. 9 and 10 show a third embodiment of a screw according to the invention in two variants in the form of a so-called hanger bolt (Stockschraube). In this embodiment parts that are identical or that have an identical effect are designated with reference numerals that are increased by 10 when compared to the reference numerals in FIGS. 7 and 8.

In FIGS. 9 and 10, as in the first embodiment according to FIGS. 1 to 3, a uniform thread portion 22 is provided. Instead, in case of a corrosion-resistant screw the thread portion could also be divided into two separate thread sections, as has been explained at hand of the second embodiment with reference to FIGS. 7 and 8.

The uniform thread portion 22 is designed in a manner identical to that of the first embodiment according to FIGS. 1 to 3 so that there is no need to describe it again. Instead of a smooth-walled shaft portion 6, in this embodiment, however, a further thread portion 26 is provided which has a metric thread of approximately the same external diameter as the external diameter of the thread portion 22. The thread portion 22 and the thread portion 26 are welded together at a separating joint 28.

The hanger bolt shown in FIG. 10 differs from that according to FIG. 9 in that between the thread portion 22 and the thread portion 26 comprising a metric thread a step 29 similar to that of the second embodiment according to FIGS. 7 and 8 is provided for the same reasons, namely with regard to a plastic hinge spaced apart by the distance 1 from the drill hole mouth, so as optimally to use the transverse loadability of the screw, the distance 1 being also between 0.5 times and 1.5 times the core diameter of the thread portion 22, when identical material pairing of steel concrete are provided.

FIG. 11 shows a screw according to FIG. 10 in a state mounted similar to that of the second embodiment according to FIGS. 7 and 8 on a concrete wall 30, wherein an attachment part 32 has been pressed onto a concrete wall 30 by means of a nut 33 screwed onto a thread portion 26.

FIG. 12 shows a screw according to FIGS. 1 to 3 with a thread portion 2 and a smooth-walled shaft portion 6 made of solid material in a mounted state. In this state an attachment part 32 is held so as to be fixed between a hexagon head 7 of the screw and a concrete wall 30.

FIGS. 11 and 12 also illustrate the following: any corrosion attack due to the influence of weather or other conditions is possible only via the drill hole mouth on the concrete wall 30 and loses its influence with increasing depth of the drill hole. If in a two-part design of the thread portion 12 according to FIGS. 7 and 8 the load-carrying thread section 12a of the thread portion 12 were made from a high-alloy corrosion-resistant stainless steel, corrosion of the furrowing thread section 12b in the depth of the drill hole 31 would be practically impossible.

The characteristics disclosed in the above description, in the claims and in the drawings can be significant to the realisation of the invention in their various embodiments both individually and in any combination.

The invention claimed is:

1. A thread-furrowing screw comprising:
a shaft portion made of solid material, said shaft portion comprising an installation end and an opposite disposed attachment end;
a thread portion adjoined to the attachment end of the shaft portion and extending away from the shaft portion, said thread portion being wound from a profiled metal strip, said thread portion forming a cylindrical shape being axially aligned with the shaft portion;

wherein the profiled metal strip comprises oppositely disposed edges along the length of the profiled metal strip and wherein the oppositely disposed edges are adjacent each other in the thread portion.

2. The thread-furrowing screw according to claim 1, wherein the thread portion comprises first and second thread sections attached to each other;

wherein the first thread section with the screw-in end comprises a hardenable metal, and the second thread section, which is attached to the shaft portion, comprises a corrosion-resistant metal.

3. The thread-furrowing screw according to claim 2, wherein the hardenable metal is steel with a high carbon content.

4. The thread-furrowing screw according to claim 2, wherein the corrosion-resistant metal is a high-alloy steel.

5. The thread-furrowing screw according to claim 1, wherein a leading end of the shaft portion has a reduced diameter which, in particular, approximately corresponds to the core diameter of the thread portion.

6. The thread-furrowing screw according to claim 5 wherein the length of the leading end with the reduced diameter corresponds to 0.5 times to 1.5 times the core diameter of the wound thread portion.

7. The thread-furrowing screw according to claim 1, wherein the thread portion is hollow.

8. A method for manufacturing a corrosion-resistant thread-furrowing screw with a shaft portion made from solid material, comprising:

a second-strip section consisting of a profiled strip made from corrosion-resistant steel is provided, a first strip section consisting of a profiled strip comprising hardenable steel is provided, the second strip section is connected to the first strip section, the two strip sections are jointly wound to form a thread portion having oppositely disposed edges adjacent with each other along the length of the thread portion, the wound thread portion is hardened in the region of the screw-in end, the wound thread portion is joined to an end of the shaft portion and extending away from the shaft portion.

9. The method according to claim 8, wherein the corrosion-resistant steel is a high-alloy steel, and the hardenable steel is an engineering steel with a high carbon content.

10. The method according to claim 8, wherein the thread sections are-joined to each other to generate a uniform thread portion, which is attached to the shaft portion by welding.

11. A method for manufacturing a corrosion-resistant thread-furrowing screw with a shaft portion made from solid material, comprising:

a profiled strip made from a corrosion-resistant steel is wound to form a second thread section, a profiled strip made from a hardenable steel is wound to form a first thread section and is subsequently hardened, the second thread section is connected to the first thread section to form a uniform thread portion having oppositely disposed edges adjacent with each other along the length of the thread portion, the second thread section is joined to an end of the shaft portion and extending away from the shaft portion.

12. The method according to claim 11, wherein the corrosion-resistant steel is a high-alloy steel, and the hardenable steel is an engineered steel with a high carbon content.

13. The method according to claim 11, wherein the thread sections are joined to each other to generate a uniform thread portion, which is attached to the shaft portion by welding.

14. A thread-furrowing screw comprising:

a shaft portion made of solid material, said shaft portion comprising an installation end and an opposite disposed attachment end;

a thread portion adjoined to the attachment end of the shaft portion and extending away from the shaft portion, said thread portion being wound from a profiled metal strip, said thread portion forming a cylindrical shape being axially aligned with the shaft portion;

wherein the profiled metal strip forms the crests, roots and shaft of the thread portion.

* * * * *